Sept. 5, 1939.  A. R. BROWN  2,171,740

CONTROL APPARATUS FOR LIQUID COOLERS

Filed Aug. 26, 1937  2 Sheets-Sheet 1

INVENTOR.
ARTHUR R. BROWN.
BY
ATTORNEYS.

Sept. 5, 1939.　　　　A. R. BROWN　　　　2,171,740
CONTROL APPARATUS FOR LIQUID COOLERS
Filed Aug. 26, 1937　　　2 Sheets-Sheet 2

WITNESSES:
R. J. Riegle.
E. H. Lutz.

INVENTOR
ARTHUR R. BROWN.
BY
ATTORNEY

Patented Sept. 5, 1939

2,171,740

UNITED STATES PATENT OFFICE 2,171,740

CONTROL APPARATUS FOR LIQUID COOLERS

Arthur R. Brown, Chicopee Falls, Mass., assignor to Westinghouse Electric & Manufacturing Company, East Pittsburgh, Pa., a corporation of Pennsylvania Application August 26, 1937, Serial No. 160,988

7 Claims. (Cl. 257—3)

My invention relates to liquid coolers that are adapted for installation in locations subject to sub-freezing temperatures and it has for an object to provide improved apparatus for this service. This application is a continuation in part of my application Serial No. 113,550, filed December 1, 1936, and assigned to the assignee of the present application.

It is a further object of my invention to provide an improved control for a liquid cooler having a refrigerating machine and heating means wherein these elements are operated independently of each other and in such manner that the operation of one will not affect operation of the other.

A further object of the invention is to maintain the temperature of a liquid cooler above freezing and to control the maintained temperature in accordance with the temperature of the air in the cooler adjacent the coldest liquid containing portion thereof.

These and other objects are effected by my invention as will be apparent from the following description and claims taken in connection with the accompanying drawings, forming a part of this application, in which:

Liquid coolers have been provided heretofore with heaters for preventing freezing of the liquid when subjected to low ambient temperatures, which heaters have been controlled thermostatically in response to liquid temperatures for preventing freezing. Certain disadvantages may be experienced in operating such coolers, particularly when water cooled refrigerating machines are employed.

As an example, when heaters are applied directly to the water, a defective thermostat may cause the water to be heated sufficiently to scald a user when the water valve is opened. If the heaters are employed for heating the air in the cooler casing in response to water temperature, it is possible for the water cooling parts of the system to freeze at times when the ambient air temperature is below 32° F. and temperature of the water supply is high enough to prevent operation of the heaters. In this connection, it will be understood that water is usually cooled to temperatures as low as 42° F. so that the heater control "cut on" temperature must be below 42° F. Therefore, when the water supply temperature is slightly above 42° F. and below the temperature at which the refrigerating machine is started, the heaters would be inactive when water is being used. The refrigerating machine is inactive at this time and the water in the cooled parts thereof may freeze as it is subjected to the low ambient temperature of the air.

Furthermore, if the temperature of the water supply is very low, 34° F. for example, the heaters may be operated continuously. The portions of the apparatus adjacent the heaters may be heated sufficiently to ignite the same or in any event the continuous operation represents a waste of electricity.

The objectional operating conditions referred to in the foregoing paragraphs are oviated when controlling the heaters in accordance with my invention. I provide a thermostat responsive to the temperature of the water for controlling operation of the refrigerating machine, this controlling function being the same as practiced heretofore. However, the heaters are thermostatically controlled in accordance with my invention in response to the temperature of the air adjacent the coldest portion of the water containing structure. As described hereinafter, the danger of overheating the water, of fire, and of freezing liquid in the cooler is obviated by my invention. The following description relates to one form of water cooling apparatus controlled in accordance with the invention and the various temperatures recited are applicable to this particular form of cooler and may vary with other types of water coolers.

Figure 1:
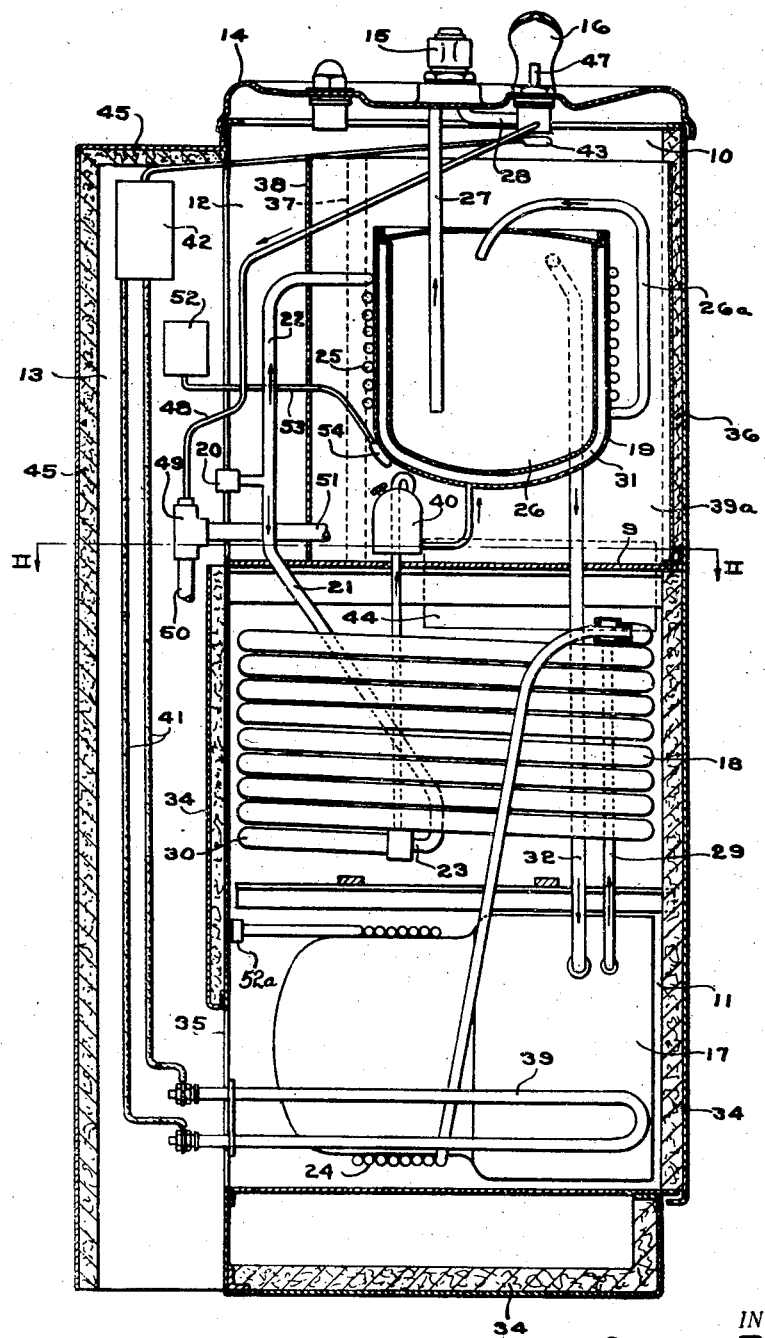
Fig. 1 is a vertical sectional view taken through a water cooler having my improved control apparatus applied thereto.
Figure 2:
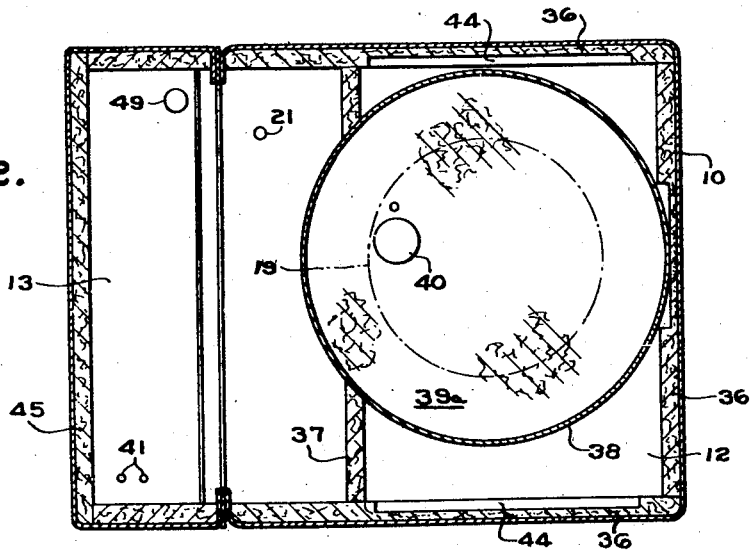
Fig. 2 is a section taken along the line II—II of Fig. 1.

Referring now to the drawings, the cooler 10 is divided into three main compartments, namely, a machinery compartment 11, a cooling compartment 12 disposed above the machinery compartment 11, and separated therefrom by a partition 9, and an air circulating compartment 13, overlapping both the compartments 11 and 12 at one side thereof and extending the entire width of the cabinet 10 as shown in Figs. 1 and 2. A cover 14 is provided for the cabinet 10 and a water withdrawal valve 15 and a bubbler 16 are carried thereby.

A motor and compressor (not shown) are contained within a metallic hermetically sealed casing 17 which is disposed in the bottom of machinery compartment 11. A water-cooled condenser 18 is disposed above the sealed casing 17 also in the machinery compartment 11. A fabricated metal evaporator generally indicated at 19, for cooling the water for consumption, is disposed in the cooling compartment 12.

The water circuits for the apparatus are as follows: Water for both cooling the condenser and for consumption enters through a fitting 20, after which the water branches, as shown in Fig. 1, the water for cooling the condenser and the motor-compressor unit entering the conduit 21 extending downwardly from the fitting 20, and the water to be cooled for consumption entering the conduit 22 extending upwardly from the fitting 20. The conduit 21 connects to an inner concentric pipe 23 of the condenser 18 and after traversing this pipe enters a conduit 24 coiled around the sealed casing 17. The water, therefore, abstracts heat from the condenser 18 and the sealed casing 17. Suitable control devices may, of course, be provided for effecting flow of cooling water only when the motor and compressor are operating and it is necessary to abstract heat therefrom and from the condenser 18.

The water for drinking purposes leaves the conduit 22 and enters a metal coiled conduit 25 wrapped around the exterior of the evaporator 19. A conduit 26a conveys the water leaving the coiled conduit 25 to a cooling and storage chamber 26 of the evaporator 19. Water is withdrawn from the cooling chamber 26 through a conduit 27 when the valve 15 is actuated and is conveyed to the bubbler 16 through a conduit 28 extending between the bubbler 16 and the withdrawal valve 15. Waste water from bubbler 16 is conveyed by conduit 51 (partially shown) to drain fitting 49.

Suitable drains (not shown) may be provided for the condenser water, connecting to drain fitting 52a, and for the water cooled for drinking, after it leaves the drain fitting 49 by conduit 50.

The refrigerant circuit of the apparatus is as follows: Refrigerant is compressed by a compressor contained in the sealed casing 17 and is conveyed through a conduit 29 to a coiled pipe 30 disposed concentrically outside the coiled water pipe 23, the two pipes 23 and 30 forming the condenser 18. Refrigerant liquefied in the condenser 18 is conveyed to an expansion device 40, diagrammatically shown in Fig. 1, and from thence to a vaporizing chamber 31 of the evaporator 19. Heat is abstracted from the liquid to be cooled by vaporization of refrigerant in the chamber 31, the liquid first being precooled through the metal-to-metal contact of the coiled conduit 25 with the evaporator 19 and then being maintained at a low temperature in the liquid storage chamber 26. Vaporized refrigerant is withdrawn from the vaporizing chamber 31 by the compressor and is returned thereto through a conduit 32 extending between the vaporizing chamber 31 and the sealed casing 17.

Figure 3:
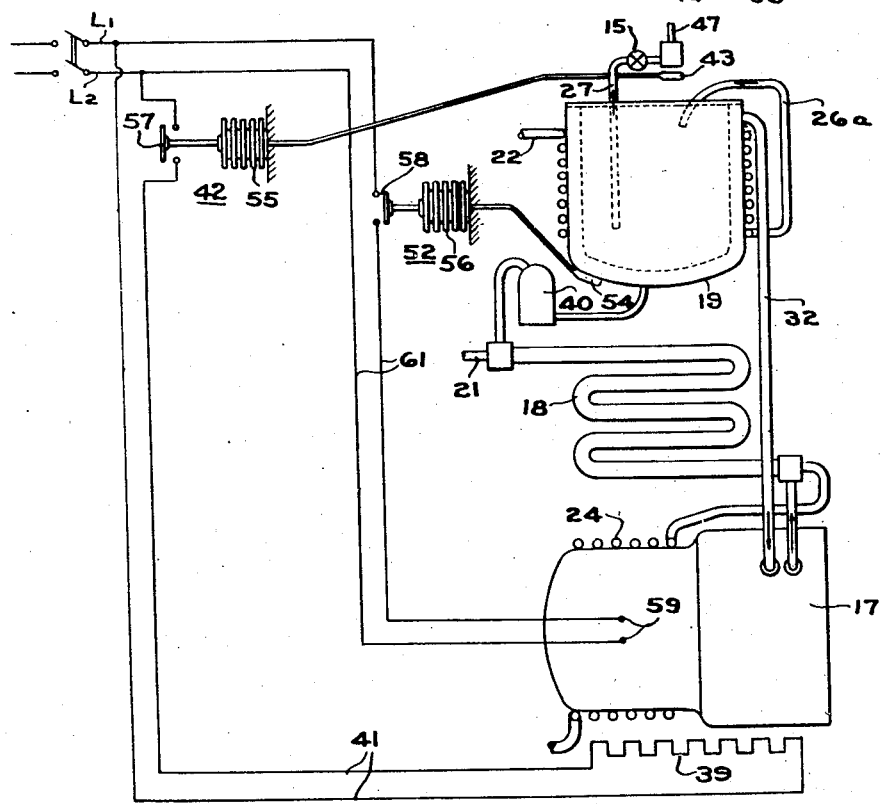
Fig. 3 is a diagrammatic view showing various elements of the cooler shown in Figs. 1 and 2.

As shown in Figs. 1, 2, and 3, the machinery compartment 11 includes a bottom wall and vertical side walls, shown at 34, and formed of heat insulating material. An aperture 35 is formed in one of the side walls and provides communication between the machinery compartment 11 and the bottom of the air duct 13.

As shown in Figs. 1 and 2, the cooling compartment 12 is provided with heat insulation 36 on three vertical walls thereof. There is provided a vertical baffle 37, also formed of heat insulating material, facing the air duct compartment 13 and terminating below the top of the cooling compartment 12. The evaporator 19 is surrounded by a cylindrical container 38 and the space between the evaporator 19 and the container 38 is packed with loose heat insulating material 39a. The baffle 37, as shown in Fig. 2, is formed of two pieces of material extending from opposite side walls of the cooling compartment 12 and contacting with the cylindrical container 38 in such a manner that a small portion thereof extends through the baffle 37.

In order to prevent freezing of water in the apparatus when it is exposed to below freezing temperatures of the ambient atmosphere, one or more heaters 39 are disposed in the machinery compartment 11 adjacent the sealed casing 17 and are connected to a source of electrical power (not shown) by means of conductors 41 leading to a control box 42. The control (not shown) within the box 42 operates in accordance with the present invention to energize the heaters when the temperature of the air within the dispenser 10 adjacent the coldest portion thereof is below a predetermined value. In liquid coolers of the type and construction shown, I have found that the air adjacent the bubbler 16 represents the coldest zone within the cooler structure 10. Accordingly, I dispose a temperature responsive control bulb 43 within this zone for operating the control mechanism 42. The bulb 43 is constructed in a manner well known in the art and contains a fluid, the pressure of which is a function of its temperature. Expansion and contraction of the fluid actuates the control mechanism in a well known manner for respectively deenergizing and energizing the heaters 39.

The heaters 39, when energized, heat the air within the machinery compartment 11, thus preventing the water in the coil 24 and in the condenser pipe 23 from freezing. As the air is heated, it rises, and as shown best in Figs. 1 and 2, it enters the cooling compartment 12 through slots 44 cut in the insulation 36 in the machinery and cooling compartments, respectively. The heated air then contacts with the cylindrical jacket 38 on its sides and top, thus preventing the water in the coil 25, storage chamber 26, and conduit 27 from freezing. The heated air then contacts the under side of valve 15, bubbler 16, top 14, and conduits 27 and 28, preventing the water therein from freezing. As the air is cooled by contact with the cool parts of the apparatus and the cold cover 14, it drops downwardly on the side of the baffle 37 opposite to the evaporator 19, and continues its downward path through the air duct 13, which is also provided with heat insulation 45. The air however contains an appreciable amount of heat, and prevents freezing of the liquid in the conduits 22, 50, and 51 and in the fittings 20 and 49. The cool air enters the machinery compartment 11 through the aperture 35 connecting the compartments 11 and 13 and again rises as it is heated by the heating elements 39.

A portion 47 of the bubbler 16 which contains water is exposed to the ambient air, and may not be sufficiently heated to prevent freeezing. A small drain pipe 48, connecting to drain fitting 49 and drain conduit 50, is, therefore, provided to drain the water out of the portion 47 of the bubbler each time the withdrawal valve 15 is closed after water has been withdrawn.

By arranging the heater or heaters 39 so that they heat the air within the cooler structure 10, an inherent disadvantage found in former freeze-proof coolers where the heaters are disposed directly in heat transfer relation with the liquid being treated and wherein steam generation caused by a defective thermostat may endanger a user at the time of opening the valve 15 is overcome.

A thermostatically operated device 52 is provided for controlling the operation of the motor-driven compressor within the casing 17. The device 52 includes a bulb 54 connected to the device 52 by a conduit 53, the bulb 54 containing a fluid which expands and contracts as the temperature thereof increases and decreases. The operation of the control device 52 is such that it initiates and terminates operation of the refrigerating system in response to predetermined high and low temperatures at the bulb 54. Preferably, the bulb 54 responds to changes in the temperature of the evaporator 19 and, as the temperature of the latter varies with the temperature of the water therein, the bulb 54 is responsive to water temperature.

The various elements of my improved liquid cooler control are diagrammatically shown in Fig. 3. The control devices 42 and 52 are shown including bellows 55 and 56 connected to the respective bulbs 43 and 54. Switches 57 and 58 are operated by the bellows 55 and 56 and control, respectively, the heater 39 and the motor compressor of the refrigerating system. The source of electrical power is shown by line conductors L1 and L2 to which the conductors 41 of the heater are connected under control of the switch 57. Terminals 59 of the compressor motor (not shown) are connected to the conductors L1 and L2 by conductors 61, controlled by the switch 58.

The construction of the control devices 42 and 52 per se forms no part of my invention, and any conventional control mechanism may be employed. Devices of this character usually include manually adjustable means for varying the temperature to be maintained. As the construction and operation of control devices of the type shown at 42 and 52 are well known, further description of them is deemed unnecessary.

As referred to heretofore, certain operating difficulties may be experienced in controlling the heaters 39 in response to water temperature. In accordance with the present invention, the heating means 39 is controlled in response to the temperature of the air in a region within the insulated walls of the cooler structure which region more rapidly reflects changes in ambient temperature. In the cooler structure which I have chosen to show, this region is adjacent the bubbler 16.

The thermostatic device 42 is adjusted to energize the heater 39 when the air temperature surrounding the bulb 43 is 48° F. and to deenergize the heater when the temperature is 58° F. Accordingly, the thermostat has an operating range of 10° F. When the ambient temperature is just slightly below 48° F., the heaters will be energized for a relatively short period to bring the temperature within the chamber 12 to 58° F., at which time the heater 39 will be deenergized. As the ambient temperature drops to lower values, the period of time that the heater 39 operates is increased due, primarily, to the increased loss of heat through the cabinet walls and top. At a minimum expected ambient temperature of, for example, −23° F., the rate of heat flow from the interior of the cooler structure to the ambient atmosphere is at a maximum for this particular heater and cabinet and the heater 39 is operated for relatively long periods.

The thermostatic device 56 may be adjusted to start operation of the compressor at a maximum temperature of 46° F. and to terminate operation of the same at 37° F. for producing an average water temperature of approximately 45° F.

Operation

During warm weather, the heater 39 will not be energized unless the ambient temperature is depressed to 48° F. The water being cooled is maintained at an average temperature of 45° F. by the control device 56. It will be understood that the rate of heat transfer between the insulated cold water chamber 26 and the air within the chamber 12 is low and that a change in temperature of one will not greatly affect the temperature of the other. Therefore, the cooling effect upon the air by the cold water in the chamber 26 will not cause operation of the heater 39 in the absence of a low temperature of the ambient atmosphere of approximately 48° F.

Assume that the ambient temperature is 20° F. There is a loss of heat from the compartment 12 to the ambient atmosphere so that the heater is intermittently operated to maintain the temperature of the air in the compartment 12 between 48 F. and 58° F. The amount of heat imparted to the water in the chamber 12 is negligible so that the thermostat 52 is not affected sufficiently to operate the compressor. If the water supply at this time is above 46° F., the compressor may be operated, but it is probable that the water supply will be below 46° F. In any event, operation of the compressor is effected by water supply temperature and not to the operation of the heaters. As stated heretofore, the bubbler 16 is the coldest portion of the water circuit at low ambient temperatures and, at 20° F. ambient temperature, the temperature of the bubbler 16 is maintained by the heaters 39 from 42° to 48° F.

When the ambient temperature is −18° F., the rate of heat loss from the air in the chamber 12 to the ambient atmosphere is high so that the heater 39 is operated for relatively longer periods. At this time, the temperature of the water in the bubbler 16 is maintained between 34° F. and 37° F. with interior air temperatures of 48° F. and 58° F., respectively. The temperatures referred to in the foregoing are based upon no water flowing. If water is being used at the bubbler, it will affect the bubbler temperature. At low ambient temperatures, the bubbler will be warmed by the water and at high ambient temperature, it will be cooled. In any event, the flow of water in the bubbler will have little or no effect upon the temperature of the air adjacent the bubbler or upon the bulb 43 of the thermostat 42.

As stated heretofore, the air in the chamber 12 adjacent the bubbler 16 is the coldest region within the cooler cabinet so that other water containing elements including the condenser 18 are maintained at higher temperatures. If the control device is adjusted to maintain the bubbler 16 above freezing temperatures, the water in the remaining elements will also be maintained above freezing. The thermostat 52 is, obviously, directly responsive to the air temperature within the cabinet and indirectly responsive to the ambient atmospheric temperature.

From the foregoing, it will be apparent that the control devices will operate independently of one another and that operation of the heater will not cause operation of the compressor and vice versa. The control of air temperature in the manner disclosed is advantageous over an arrangement wherein the control is in response to water temperature as, in the latter case, the heater control would necessarily be adjusted to values below the cooled water temperature or approximately between 34° F. and 38° F. If the water supply were 40° or higher with a low ambient air temperature and assuming water were being used, the heaters would not turn on and it is possible that the condenser water may freeze, the condensing unit being idle at this time. Also, with relatively low temperature supply water, the heaters may be kept in continuous operation as water is used with the result that the heaters may be kept energized continuously with the possibility of overheating and damaging the mechanism adjacent the heaters.

It will be apparent from the foregoing explanation of my invention that I have provided an improved control for a liquid cooler having means for preventing freezing when subjected to sub-freezing temperatures wherein the heating means and the cooling means are independently controlled and in such manner that operation of one does not affect operation of the other.

I have shown my improved control applied to one form of water cooling mechanism and have recited temperature conditions for this particular form of cooler, but it will be understood that the invention is equally applicable to other forms of liquid cooling apparatus, wherein the recited temperature may vary, without departing from the spirit and scope of the invention.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In water cooling apparatus, the combination of a casing including insulated wall members for defining a space therebetween, means for dividing the space into a cooling compartment and a machinery compartment, a container for water to be cooled in the cooling compartment, a conduit for conveying cooled water to the exterior of the casing, an evaporator for cooling the container, means for circulating refrigerant through the evaporator and including water cooled heat dissipating elements, heating means disposed in said machinery compartment, means providing for the circulation of air between the machinery compartment and the cooling compartment and means responsive to the temperature of the air in said casing adjacent said water conveying conduit for controlling the energization of the heating means.

2. The combination as claimed in claim 1 including means responsive to the temperature of the evaporator for controlling the operation of the refrigerant circulating means.

3. In liquid cooling apparatus, the combination of a heat insulated cabinet embodying an evaporator compartment, a refrigerant evaporator disposed in the compartment for cooling liquid for drinking purposes, means for heating air within the cabinet and circulating it in heat exchange relation with the evaporator and with the liquid to be cooled when the ambient temperature surrounding the cabinet is below the freezing point of the liquid, said heating means being disposed outside of the evaporator compartment, and an air duct for returning air from the evaporator compartment to the heating means.

4. In liquid cooling apparatus, the combination of a heat insulated cabinet, refrigerating apparatus comprising heat generating elements and a heat abstracting element disposed within the cabinet, said cabinet embodying a compartment for housing the heat generating elements and a second compartment spaced from the aforesaid compartment for housing the heat abstracting element, a supply of liquid to be cooled arranged in heat exchange relation with the heat abstracting element, a second supply of liquid for abstracting heat disposed in heat exchange relation with the heat generating elements, and means disposed in the compartment housing the heat generating elements for heating air within the cabinet and circulating it in heat exchange relation with said liquids when the ambient temperature surrounding the cabinet is below the freezing point of the liquids.

5. In liquid cooling apparatus, the combination of a cabinet construction, a refrigerating apparatus embodying heat generating elements and a heat abstracting element disposed within the cabinet, said cabinet being divided into two compartments insulated from each other for housing, respectively, the heat abstracting element and the heat generating elements, said compartment which houses the heat abstracting element being disposed above the compartment which houses the heat generating elements, heat insulation covering vertical walls of both of said compartments, said heat insulation in said compartments being provided with communicating slots for the circulation of air therebetween, a supply of liquid to be cooled arranged in heat exchange relation with the heat abstracting element, a second supply of liquid for abstracting heat from the heat generating elements and means disposed in the compartment housing the heat generating elements for heating air within the cabinet, said heated air being circulated in heat exchange relation with the liquid for abstracting heat from the heat generating elements, then through the slots in the insulation, and then in heat exchange relation with the liquid to be cooled.

6. In liquid cooling apparatus, the combination of a cabinet construction, a refrigerating apparatus embodying heat generating elements and a heat abstracting element disposed within the cabinet, said cabinet being divided into two compartments insulated from each other for housing, respectively, the heat abstracting element and the heat generating elements, said compartment housing the heat abstracting element being disposed above the compartment housing the heat generating elements, both of said compartments being provided with heat insulation on their vertical walls, said heat insulation in both of said compartments being provided with communicating slots for the circulation of air therebetween, a supply of liquid arranged in heat exchange relation with the heat abstracting element and a second supply of liquid for abstracting heat from the heat generating elements, and means disposed in the compartment housing the heat generating elements for heating air within the cabinet and circulating it in heat exchange relation with the liquid for abstracting heat from the heat generating elements, then through the slots in the insulation, and then in heat exchange relation with the liquid arranged in contact with the heat abstracting element, and a heat insulated duct extending from the top of the compartment housing the heat abstracting element to the bottom of the compartment housing the heat generating elements for returning air from the first compartment to the last compartment.

7. In liquid cooling apparatus, the combination of a heat insulated cabinet divided into an apparatus compartment and a cooling compartment disposed above the apparatus compartment, a mechanical refrigerating unit disposed in the apparatus compartment, an evaporator disposed in the cooling compartment for cooling liquid for consumption, a water outlet disposed adjacent to the cooling compartment, water connections between the liquid cooled by said evaporator and the water outlet and also disposed in the cooling compartment, and means for heating the air within the cabinet comprising heating elements disposed in the machinery compartment and spaced from said water connections.

ARTHUR R. BROWN.